United States Patent [19]

Tsinker

[11] Patent Number: 6,150,875
[45] Date of Patent: Nov. 21, 2000

[54] APPARATUS AND METHOD FOR EQUALIZING RECEIVED NETWORK SIGNALS USING A TRANSCONDUCTANCE CONTROLLED SINGLE ZERO SINGLE POLE FILTER

[75] Inventor: Vadim Tsinker, Belmont, Calif.

[73] Assignee: Advanced Micro Devices, Inc., Suunyvale, Calif.

[21] Appl. No.: 09/140,833

[22] Filed: Aug. 26, 1998

Related U.S. Application Data

[60] Provisional application No. 60/082,183, Apr. 17, 1998.

[51] Int. Cl.[7] ...................................................... H03K 5/00
[52] U.S. Cl. ........................................... 327/552; 327/558
[58] Field of Search .................................... 327/552, 558, 327/311, 344, 437, 427; 333/18

[56] References Cited

U.S. PATENT DOCUMENTS 5,124,673  6/1992  Hershberger ............................... 333/18

FOREIGN PATENT DOCUMENTS 402004005  1/1990  Japan ...................................... 327/552
404032311  2/1992  Japan ...................................... 327/552

*Primary Examiner*—Dinh T. Le

[57] ABSTRACT

A network line equalizer includes a transconductance-controlled, tunable single zero, single pole filter that eliminates the necessity of feedback loops or operational amplifiers. The equalizer includes a first MOS transistor having a first size (S1) and a gate for receiving input voltage signal and in response outputting a first current signal. A low pass filter composed of MOS transistors outputs a filtered voltage signal, and a second MOS transistor converts the filtered voltage signal to a second current signal. The second MOS transistor has a size (S2) relative to the first size (S1) such that S2=S1 (z−p)/p, where z is the zero and p is the pole of the filter. The circuit can be duplicated for filtering of differential input voltage signals, where the four current signals can be selectively combined based on whether the zero is at a lower frequency than the pole.

26 Claims, 5 Drawing Sheets

APPARATUS AND METHOD FOR EQUALIZING RECEIVED NETWORK SIGNALS USING A TRANSCONDUCTANCE CONTROLLED SINGLE ZERO SINGLE POLE FILTER

CROSS REFERENCE TO RELATED APPLICATIONS

This application claims priority from Provisional Application No. 60/082,183, filed Apr. 17, 1998, entitled "Quad Fast Ethernet Transceiver for 10 BASE-T/100 BASE-X (QFEX 10/100)."

BACKGROUND OF THE INVENTION

1. Technical Field

The present invention relates to network line equalizers having filters for equalizing attenuated transmitted analog signals, such as multiple layer transition (MLT-3) decoded signals, from a network medium such as a 100-BASE-TX Ethernet (IEEE standard 802.3u) transmission medium.

2. Background Art

Local area networks use a network use a network cable or other network media to link nodes (e.g., workstations, routers and switches) to the network. Each local area network architecture uses a media access control (MAC) enabling a network interface device at each network node to share access to the media.

Physical (PHY) layer devices are configured for translating digital packet data received from a MAC across standardized interface, e.g., a media independent interface (MII), into an analog signal for transmission on the network medium, and reception of analog signal transmitted from a remote node via the network medium. An example is the 100 BASE-TX IEEE standard 802.3u receiver, configured for receiving a 3-level MLT-3encoded analog signal at a 125 Mb/s data rate.

One problem with transmission of analog signals on the network medium is the attenuation of high-frequency components. For example, FIG. 1A is a diagram illustrating simplified frequency response characteristics f(line) of the network medium. As shown in FIG. 1A, an MLT-3encoded signal transmitted by the network medium encounters transmission loss in the form of high-frequency attenuation. Hence, the 100-BASE-TX Ethernet (IEEE 802.3u) receiver includes a line equalizer having a high-pass filter, having the frequency response (f(filter)) of FIG. 1B to compensate for the high-frequency attenuation from the network medium. One example of a high-pass filter is a single zero filter.

FIG. 2 is a diagram illustrating a conventional single zero high-pass filter 10. As shown in FIG. 2, the high-pass filter 10 includes an operational amplifier 12, a capacitor 14 having capacitance C., a resister 16 having resistance R. As recognized in the art, the high-pass filter 10 has a transfer function $H(s)=S+Z$, where Z equals $1/RC$. Hence, the high-pass circuit 10 is considered a single zero filter, where S is a complex variable based on frequency.

A disadvantage of the high pass filter 10 is that a high bandwidth operational amplifier 12 is required for implementation. In addition, a direct connection of the high-pass filter 10 within a line equalizer may affect the impedance of the transmission line (i.e., the network medium), since the capacitor 14 and resistor 16 are in parallel with the transmission line's termination resistance. In addition, the connection of the capacitor 14 is between the two nodes ($V_{IN}$ and $V_O$), neither of which is a ground or a supply node. Hence, the high-pass filter 10 is extremely difficult to implement using CMOS technology, since a CMOS capacitor cannot be connected between two arbitrary nodes.

A single zero equalizer may not always provide the optimum compensation for the line response f(line). For example, FIG. 3 is a diagram illustrating an alternate characterization of the frequency response characteristics f'(line) of the network medium. As shown in FIG. 3, the frequency response f' includes a linear region 10 between points C and D, and a nonlinear lower frequency region 18 between points A and B. Although a single zero equalizer may compensate adequately in the linear region 10, the single zero equalizer may not compensate as well within the range 18 within the lower range of frequencies. Hence, some other function is needed to compensate for the continuation in the transmission medium according to the function f'(line). A filter providing more precise compensation over a single zero filter is the single zero, single pole filter.

A single, single pole filter operates according to the transfer function $H=(s+z)/(s+p)$, where z is a zero and p is a pole located higher than zero in the frequency range. Single zero, single pole filters are typically implemented using an operational amplifier or a switched capacitor filter, which significantly increases the complexity of the design.

SUMMARY OF THE INVENTION

There is a need for an arrangement that enables a single zero, single pole filter to be implemented using CMOS technology with minimal effort.

There is also a need for an arrangement that enables a single zero, single pole filter to be implemented without the necessity of an operational amplifier or a switched capacitor filter.

There is also a need for an arrangement for providing a single zero, single pole filter using MOS transistors that enables the filter to be tuned in response to an external control signal.

These and other needs are attained by the present invention, where first and second metal oxide semiconductor (MOS) transistors have respective first and second sizes selected based on a prescribed relation between a pole and a zero of the filter. The first MOS transistor receives an input voltage signal, and the second MOS transistor receives a filtered voltage signal from a low pass filter, preferably formed from MOS transistors. The output current from the first and second MOS transistors are combined to provide a output signal equalized in accordance with the single zero and the single pole.

According to one aspect of the present invention, a filter having a zero and a pole includes a first metal oxide semiconductor (MOS) transistor having a first size and a gate for receiving an input voltage signal, wherein the first MOS transistor in response outputs a first current signal. A low pass filter outputs a filtered voltage signal in response to the input voltage signal and based on a pole defined by a prescribed resistance and a prescribed capacitance. A second MOS transistor has a second size relative to the first size by a prescribed relation between the pole and the zero. The second MOS transistor has a gate for receiving the filtered voltage signal, and the second MOS transistor in response outputs a second current signal. The first and second current signals in combination provide an output signal equalized in accordance with the zero and the pole. Use of the MOS transistor for receiving the input signal provides an infinite DC impedance to the input terminals, significantly reducing signal attenuation at the inputs. Moreover, the MOS transistors provide a high speed operation due to the direct and simple conversion of input voltage to operating current, ensuring that the transfer function of the filter is not affected by parasitic poles at higher frequency ranges.

An additional feature of this aspect of the present invention is that the low pass filter is implemented using a MOS transistor providing the prescribed resistance, and a MOS transistor providing the prescribed capacitance. Hence, the filter is easily tunable by changing the size of the MOS transistor providing the prescribed resistance, or by adjusting the gate voltage using a control signal. The MOS gate capacitance can also be used as at least part of the capacitance element of the low pass filter, advantageous for CMOS processes where the capacitance element with arbitrary node connection is not available, as opposed to node-to-ground or node-to-$V_{cc}$ only.

Another aspect of the present invention includes a differential input filter having a zero and a pole. The filter includes a first metal oxide semiconductor (MOS) transistor having a first size and a gate for receiving a first differential input voltage signal, the first MOS transistor in response outputting a first current signal, and a second MOS transistor having the first size and a gate for receiving a second differential input voltage signal having an inverse polarity relative to the first differential input voltage signal, the second MOS transistor in response outputting a second current signal. The filter also includes first and second low pass filters outputting first and second filtered voltage signals in response to the first and second differential input voltage signals, respectively. The first and second low pass filters each output the corresponding filtered voltage signal based on a pole defined by a prescribed resistance and a prescribed capacitance. The filter also includes third and fourth MOS transistors each having a second size relative to the first size by a prescribed relation between the pole and the zero. The third MOS transistor has a gate for receiving the first filtered voltage signal and in response outputting a third current signal and the fourth MOS transistor has a gate for receiving the second filtered voltage signal and in response outputting a fourth current signal. The first, second, third and fourth current signals in combination provide a differential output signal equalized in accordance with the zero and the pole. The use of MOS transistors provide a single zero, single pole filter that does not require feedback loops or operational amplifiers. In addition, the filter can be cascaded with additional transconductance filters to form more complex filters, such as biquadratic filters, without feedback loops or operational amplifiers. Hence, relatively complex filters can be easily implemented in relatively small sizes.

Still another aspect of the present invention provides a method of equalizing an input signal according to a single zero and a single pole. The method includes first outputting a first current signal from a first metal oxide semiconductor (MOS) transistor in response to receiving an input voltage signal at a corresponding gate, the MOS transistor having a first size, second outputting a filtered voltage signal from a low pass filter in response to receiving the input voltage signal, the low pass filter having a pole defined by a prescribed resistance and a prescribed capacitance, third outputting a second current signal from a second MOS transistor in response to receiving the filtered voltage signal, the second MOS transistor having a second size relative to the first size by a prescribed relation between the pole and a transfer function zero, and combining the first and second current signals to obtain a filtered signal.

Additional objects, advantages and novel features of the invention will be set forth in part in the description which follows, and in part may become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1A:
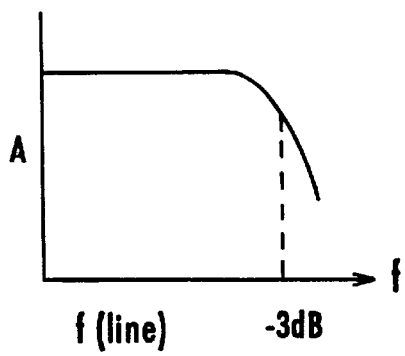
FIGS. 1A and 1B are diagrams illustrating simplified frequency response characteristics of a network medium and a single zero line equalizer, respectively.
Figure 1B:
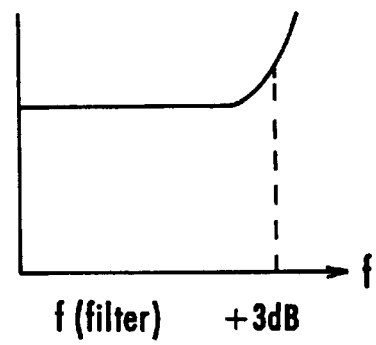
Figure 2:
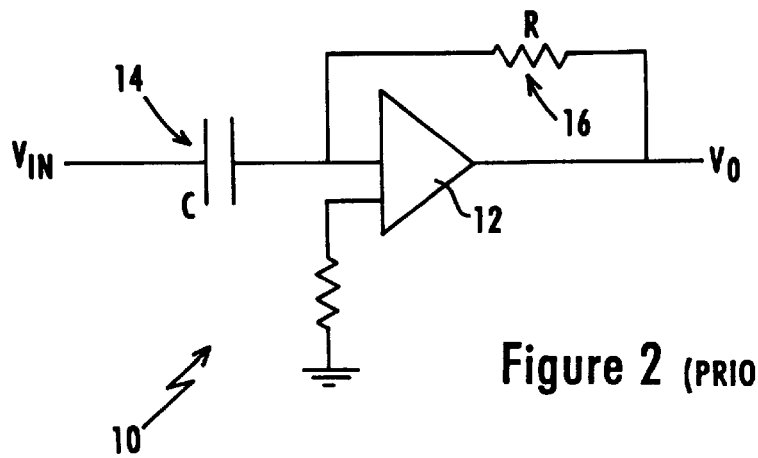
FIG. 2 is a diagram illustrating a prior art signal zero high pass filter.
Figure 3:
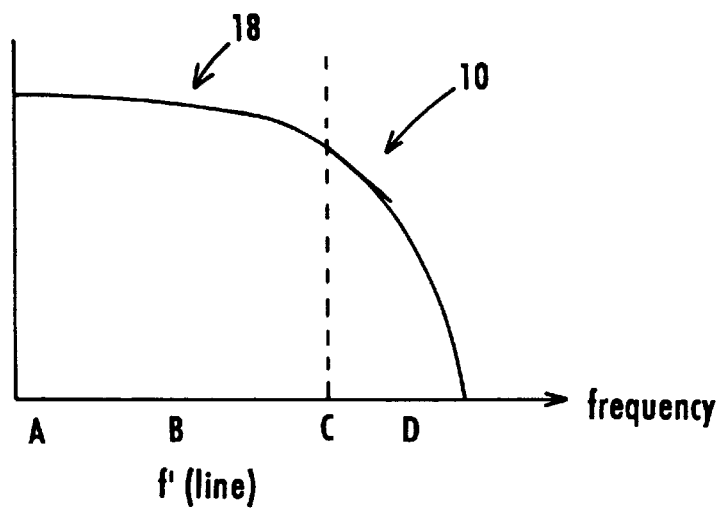
FIG. 3 is a diagram illustrating higher-order frequency response characteristics of a network medium.
Figure 4A:
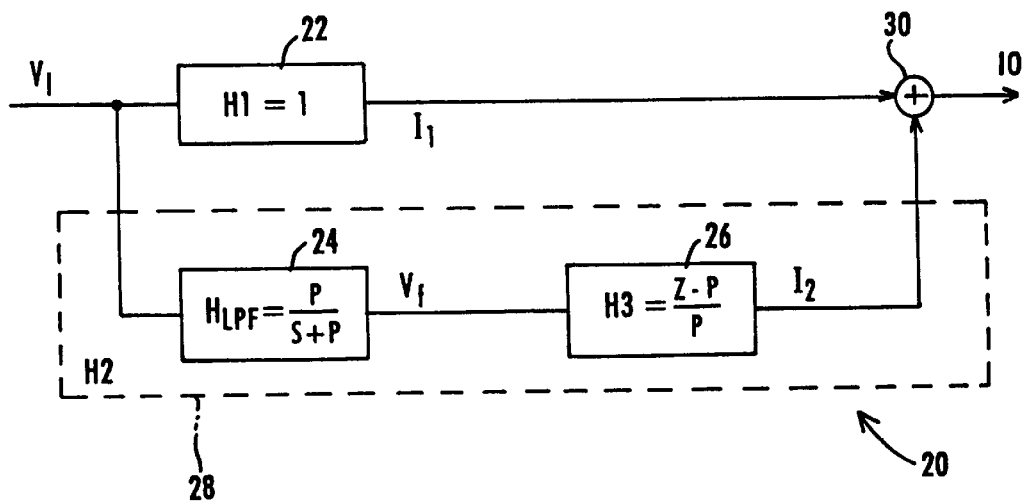
FIG. 4A is a block diagram illustrating the transfer function characteristics of a transconductance controlled tunable single zero, single pole filter according to an embodiment of the present invention.

FIG. 4A is a block diagram illustrating a single zero, single pole filter according to an embodiment of the present invention. The filter 20, also referred to as an equalizer, has a single zero and a single pole, i.e., has a transfer function $H=(s+z)/(s+p)$, where z is a zero and p is a pole, and where s represents frequency. Partial fraction expansion may be used to obtain the expression $H=(s+z)/(s+p)=1+a/(s+p)$, where $a=z-p$.

As shown in FIG. 4A, the filter 20 includes a first element 22 having the unitary response H1=1, a low pass filter 24, and a third element 26. The low pass filter 24 and third element 26 in combination form a unit 28 that is characterized by the transfer function $H2=(z-p)/(s+p)$. The system 20 also includes an output circuit 30 combining the signals output from the element 22 and the unit 28 to form the output signal 10 according to the system transfer function $H=1+(z-p)/(s+p)$.

Figure 4B:
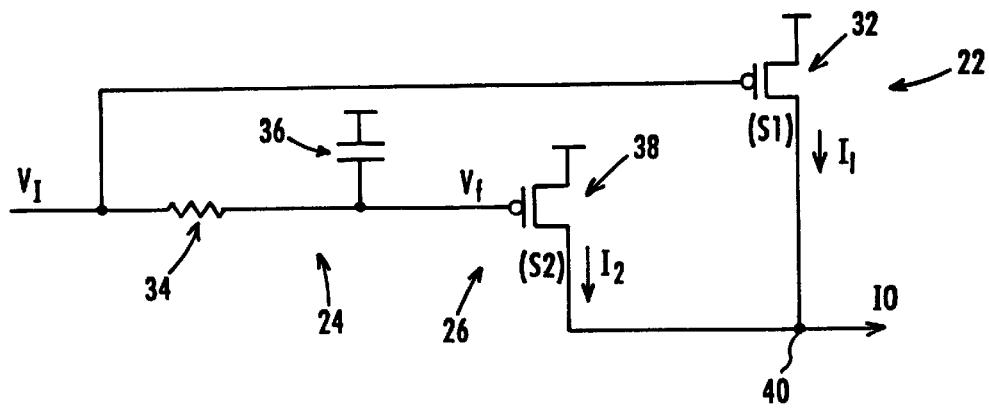
FIG. 4B is a simplified circuit diagram illustrating an implementation of the block diagram in FIG. 4A.

The transfer function $H2=(z-p)/(s+p)$ is analogous to an RC low pass filter. In particular, FIG. 4B is a circuit diagram illustrating implementation of the filter 20. As shown in FIG. 4B, the element 22 having unitary transfer function H1=1 is implemented by a MOS transistor 32. The MOS transistor 32 has a predetermined size and characteristics to operate as a simple tranconductance amplifier that converts the input voltage $V_I$ to current $I_1$. The a low pass filter 24, configured for outputting a filtered voltage signal $V_f$ in response to the input voltage signal $V_I$ includes a resistor element 34 and a capacitor element 36, implemented preferably as MOS transistors. The low pass 24 filter has a transfer function $H_{LPF}=p/(s+p)$, where $p=1/RC$. Although the voltage addition of the "1" term and the term "p/(s+p)" is complicated, a more simple method involves converting the input voltages $V_I$ and $V_f$ into currents, using the transconductance (Gm) qualities of the MOS devices, and then adding or subtracting the currents.

As described above, the low pass filter 24 has a transfer function $H_{LPF}=p/(S+p)$. However, it is also necessary to execute the entire partial fraction expansion H=1+a/(s+p), where a=z−p. Hence, it is necessary to execute the fractional component a=z−p, since the value a=p is undesirable. Hence, the unit 26 must be able to convert the expression p/(s+p) into (z−p)/(s+p). As shown in FIG. 4B, the unit 26 includes a MOS transistor 38 that outputs a current $I_2$. If the transistors 32 and 38 are identical in size, then the ratio of currents $I_1$ and $I_2$ would be equal to 1. Hence, the transfer function H3 of the unit 26 composed of the MOS transistor 38 must have a value such that $H_{LPF}H3=(z-p)/(s+p)$. Since $H_{LPF}=p/(s+p)$, then H3=(z−p)/p.

Consequently, the transfer function H3 of MOS transistor 38 is implemented by reducing the size of the MOS transistor 38 relative to the size of the MOS transistor 32. Specifically, if the MOS transistor 32 has a first size (S1), then the MOS transistor 38 has a second size as (S2) such that the size of the second transistor is based on the transfer function H3=(z−p)/p, such that S2=S1 (z−p)/p.

Hence, the MOS transistor 38 serves as a transconductance amplifier for the filtered voltage signal $V_f$, and reduces the current relative to MOS transistor 32 by an amount (z−p)/p.

Hence, the present invention enables formation of a single zero, single pole filter using MOS transistors without the necessity of operational amplifier or switched capacitor filters. The selection of the size for the MOS transistor 38 relative to the MOS transistor 32 provides a high speed operation due to a direct and simple conversion of input voltages $(V_I)$ into operating current $I_1$, and $I_2$. The currents $I_1$ and $I_2$ are combined at node 40, corresponding to the element 30, that provides an output signal equalized in accordance with the zero and the pole. The circuit of FIG. 4B is particularly effective if the pole is a lower frequency than the zero.

If the zero "z" is at a lower frequency than the pole "p" then the quantity "z−p" is negative, requiring a current subtraction. Current subtraction can be accomplished in a differential input equalizer that receives differential inputs. In particular, current subtraction is accomplished by adding the current produced by the low pass filter 24 of the negative differential input (VN) to the current produced by the positive voltage input (VP).

Figure 5:
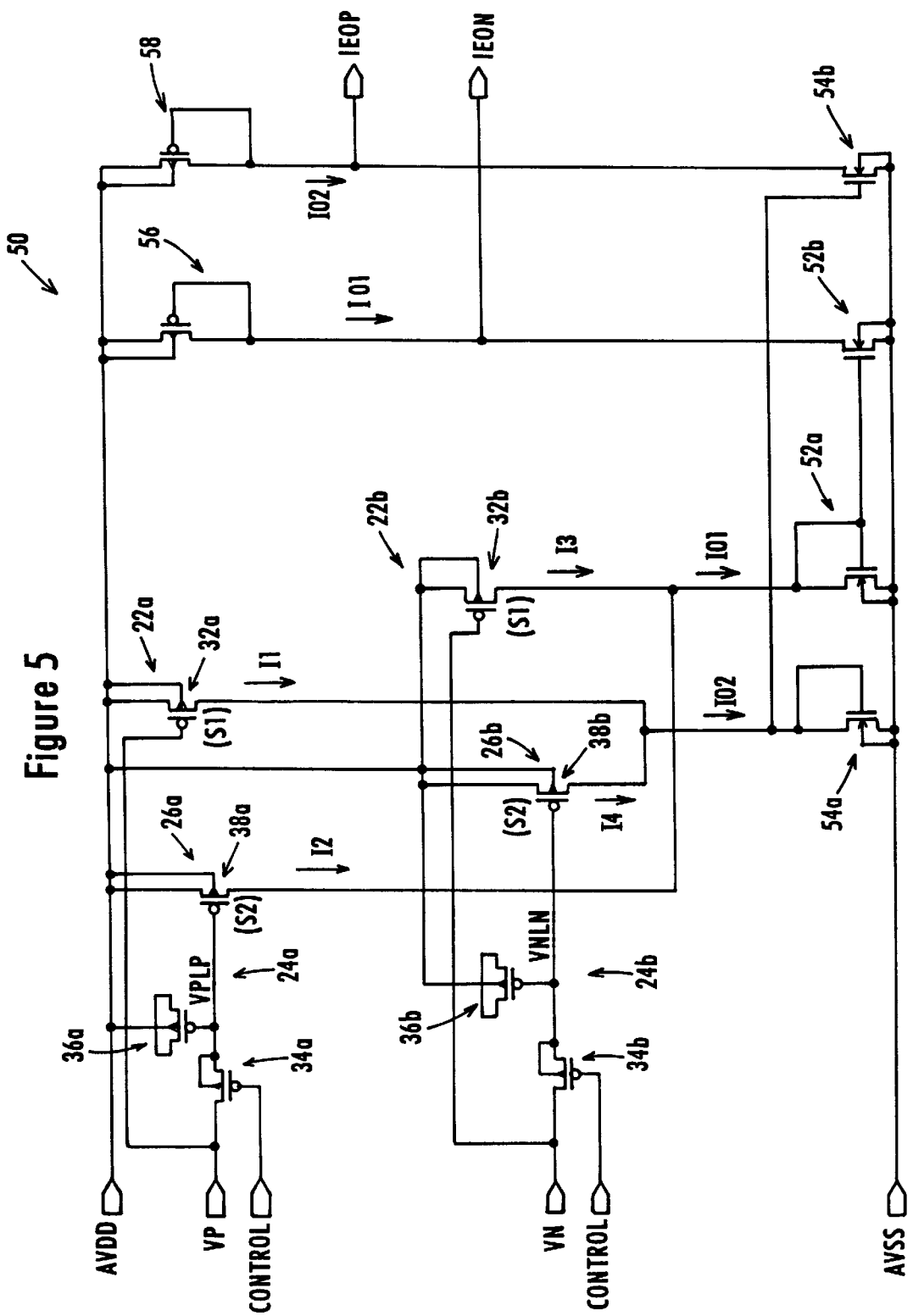
FIG. 5 is a diagram illustrating an exemplary implementation of the single zero, single pole filter of FIGS. 4A and 4B configured for receiving differential input signals.

FIG. 5 is a circuit diagram demonstrating a differential input equalizer having a single zero and single pole according to the embodiment of the present invention. As shown in FIG. 5, the differential input filter 50 includes transconductance amplifiers 22a and 22b implemented as MOS transistors 32a and 32b, respectively. Each MOS transistor 32a and 32b has a first predetermined size (S1) for converting the corresponding input voltage into a current. As shown in FIG. 5, the MOS transistor 32a has a gate for receiving the input voltage signal VP, and response outputs a current signal $I_1$. The MOS transistor 32b similarly outputs a current signal $I_3$ in response to receiving the differential input voltage signal VN at the MOS transistor gate. As recognized in the art, the differential input voltage signal VN has an inverse polarity relative to the first differential signal VP. Hence, the current signals $I_1$ and $I_3$ are substantially equal and have opposite polarity such that $I_1=-I_3$.

The filter 50 also includes low pass filters 24a and 24a, each comprising a MOS transistor 34 that provides the prescribed resistance R, and a MOS transistor 36 coupled to the resistor 34 and providing the prescribed capacitance. As shown in FIG. 5, each of the MOS transistors 34a and 34a have a control signal (CONTROL) supplied to the gate, enabling the corresponding MOS transistor 34 to provide the prescribed resistance based on the control signal. In addition, the control signal may be varied enabling the MOS transistor 34a or 34a to change the corresponding resistance based on the control signal. Hence, the frequency response of the low pass filter 24a and 24a may be tuned by independent adjustment of the control signals to MOS transistors 34a and 34a.

The low pass filters 24a and 24a output filtered voltage signals VPLP and VNLN in response to the input differential voltage signals VP and VN, respectively. As described above, each of the low pass filters 24 have a transfer function $H_{LPF}=p/(s+p)$. The filtered voltage signals VPLP and VNLN are supplied to transconductance amplifiers 26a and 26b, implemented as MOS transistors 38b and 38b, respectively.

As described above, each of the MOS transistors 38b and 38b has a second size (S2) relative to the first size (S1) of the MOS transistors 32a and 32b, such that S2=S1(z−p)/p. Since the frequency response characteristics of low pass filters 24a and 24a are essentially the same, the voltages VPLP and VNLN are substantially equal but of opposite polarity such that VPLP=−VNLN. The MOS transistor 38a outputs a current signal $I_2$ according to the function VPLP (z−p)/p= VP(z−p)/(s+p). The MOS transistor 38b also outputs a current signal $I_4$ according to the function VN (z−p)/(s+p).

The filter of FIG. 5 assumes that the zero is at a lower frequency than the pole. Hence, since $I_1=-I_3$, current subtraction is performed by adding the first current signal $I_1$ and the fourth current signal $I_4$, such that IO2 equals $I_1+I_4$ and IO1 equals $I_2+I_3$. The first differential output signal IO1 and the second differential output signal IO2 provide a differential current output for the filter 50 in accordance with the zero and the pole.

As shown in FIG. 5, the filter 50 also includes a first set of current mirrors 52a and 52b for outputting the first differential output signal IO1 and a second set of current mirrors 54a and 54a for outputting the second differential output signal IO2. As shown in FIG. 5, the filter 50 also includes load transistors 56 and 58 for converting the differential current signal IO1 and IO2 into output voltage signals IEON and IEOP, respectively.

According to the disclosed embodiment, a single zero single pole filtering function is implemented without the necessity of feedback loops for operational amplifiers. Rather, the disclosed embodiment provides a high-speed operation due to a direct and simple conversion of input voltage (VP−VN) into operating current using MOS transistors 32 and 38. Hence, the transfer function defined by the poles and the zeros is not affected by parasitic poles located high in the frequency range. In addition, the filter may be operated in a current mode or a voltage mode as desired. In current mode the current of the MOS transistors 52a and 54a may be output to a following amplifier stage. In voltage mode, the current IO1 and IO2 is dropped across resistance producing devices 56 and 58 in order to generate the output voltages IEON and IEOP.

Figure 7:
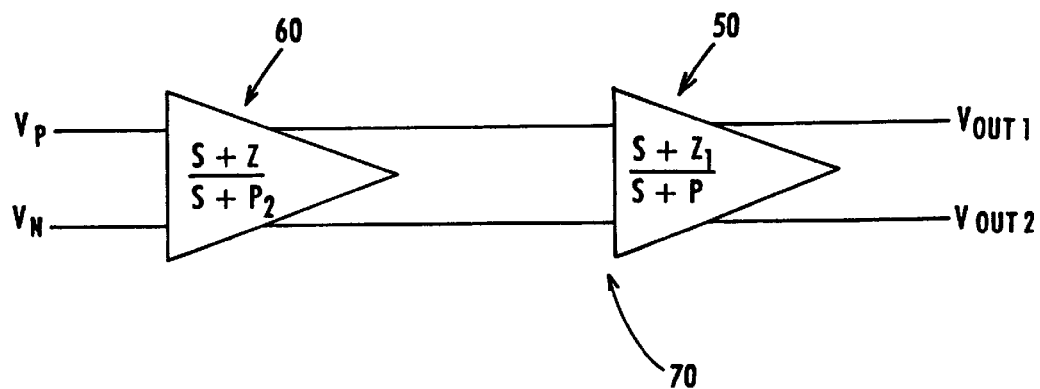
FIG. 7 Is a diagram illustrating cascaded filters used to implement biquadratic filtering using the filter of FIG. 5.

The filter 50 in FIG. 5 may also be used in series with another filter/equalizer 60 similarly formed of only transconductance—controlled MOS transistors to form a biquadratic equalizer 70. FIG. 7 is a diagram illustrating a possible configuration between the equalizer 50 and a second filter/equalizer 60. The equalizers 50 and 60 can be implemented using relatively simple components, without the necessity of feedback loops. Hence, the system of FIG. 7 has a relatively small size. In particular, the filter 60 may be a single zero filter having a high frequency parasitic pole ($p_2$). Hence, the single zero, single pole filter 50 may be connected in series in a single zero filter 60 having a parasitic pole $p_2$ to form a biquadratic equalizer 70. The elimination of feedback loops eliminates any stability issues that are normally encountered in feedback-based systems. In particular, feedback amplifier system suffer from oscillation and ringing at certain frequencies, requiring efforts to ensure amplifier stability. Use of transconductance-controlled MOS transistors to form the above-described filters, however, eliminates the necessity of a feedback loop, substantially improving stability.

Figure 6A:
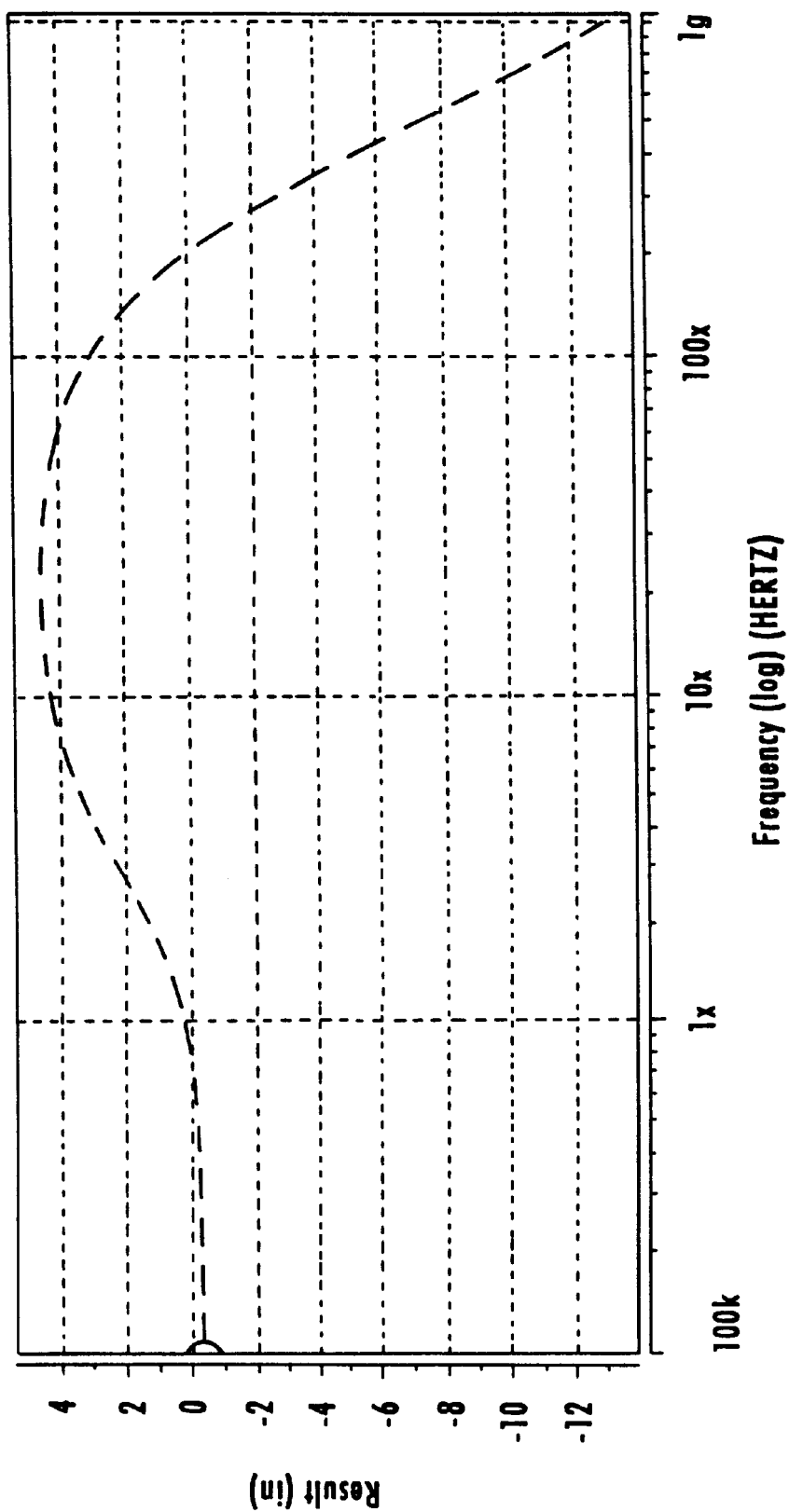
FIGS. 6A and 6B are gain and phase plots for the filter of FIG. 5, respectively.
Figure 6B:
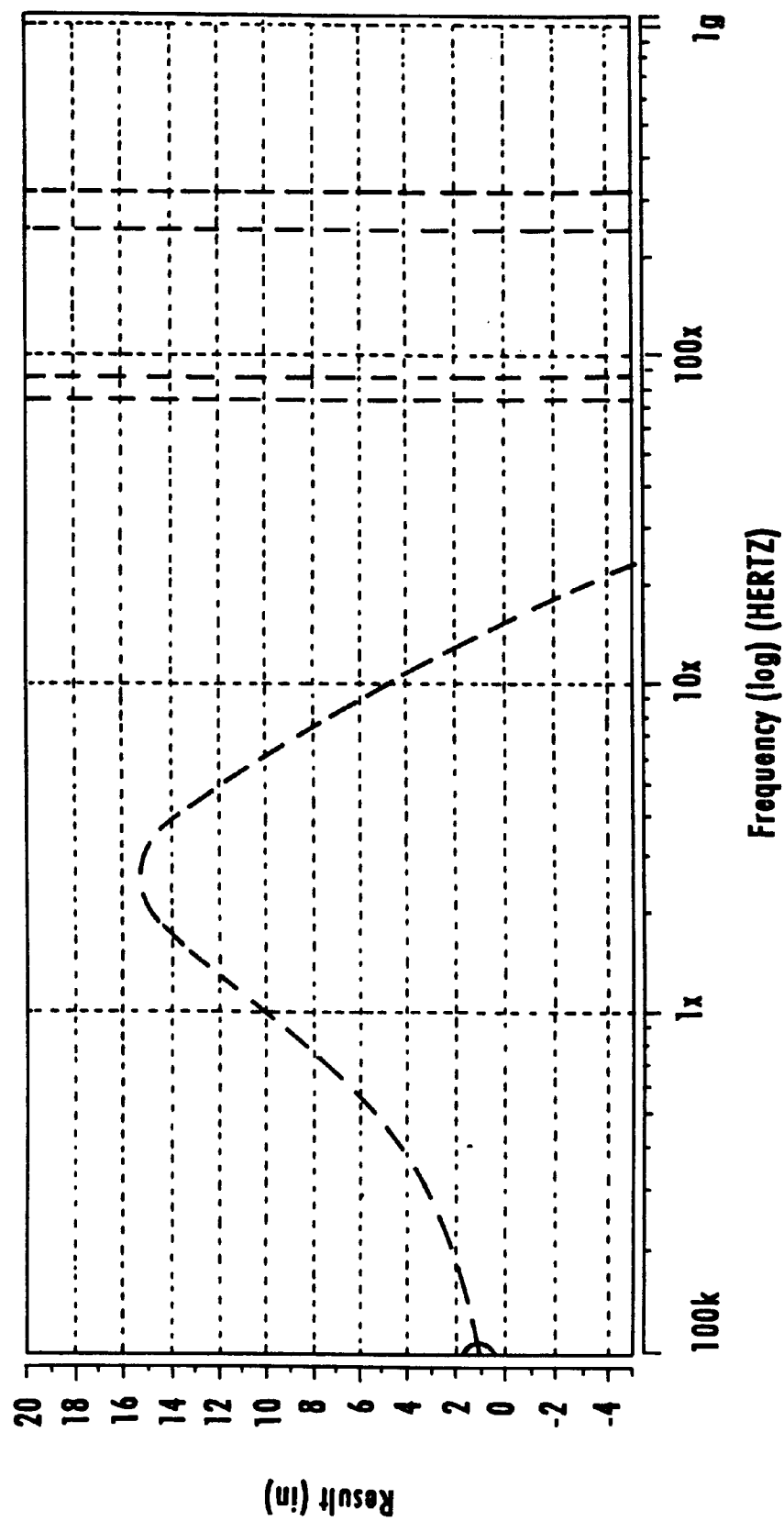

FIGS. 6A and 6B are diagrams illustrating a response of the filter 50 according to an embodiment of the present invention. FIG. 6A is a gain plot, and FIG. 6B is a phase plot. As shown in FIG. 6A, the filter is optimized for compensation of attenuated high frequency components during transmission by a network medium, such as 100 Base TX medium, while also correcting for lower frequencies.

Although this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A filter having a zero and a pole, the filter comprising:
  a first metal oxide semiconductor (MOS) transistor having a first size and a gate for receiving an input voltage signal, the first MOS transistor in response outputting a first current signal;
  a first low pass filter outputting a first filtered voltage signal in response to the input voltage signal and based on a pole defined by a prescribed resistance and a prescribed capacitance; and
  a second MOS transistor having a second size relative to the first size by in accordance with a relation between the pole and the zero, the second MOS transistor having a gate for receiving the filtered voltage signal and in response outputting a second current signal, the first and second current signals providing an output signal equalized in accordance with the zero and the pole.

2. The filter circuit of claim 1, wherein the low pass filter comprises:
  a third MOS transistor providing the prescribed resistance; and
  a fourth MOS transistor coupled to the third MOS transistor and providing the prescribed capacitance.

3. The filter of claim 2, further comprising:
  a fifth MOS transistor having a drain node for receiving the first and second current signals and a gate coupled to the drain node; and
  a sixth MOS transistor having a gate coupled to the drain node and outputting a current mirroring the first and second current signals.

4. The filter of claim 3, wherein the third MOS transistor has a gate for receiving a control signal, the third MOS transistor providing the prescribed resistance based on the control signal.

5. The filter of claim 1, further comprising:
  a third MOS transistor having the first size, and a gate for receiving a second input voltage signal having an opposite polarity relative to the input voltage signal, the input voltage signal and the second input voltage signal forming a differential input, the third MOS transistor in response outputting a third current signal;
  a second low pass filter outputting a second filtered voltage signal in response to the second input voltage signal and based on said pole;
  a fourth MOS transistor having said second size and having a gate for receiving the second filtered voltage signal and in response outputting a fourth current signal; and
  an output circuit for outputting a filtered differential output signal based on the first, second, third, and fourth current signals.

6. The filter of claim 5, wherein the output circuit includes:
  a first set of current mirrors for outputting a sum of the first current signal and the fourth current signal as a first differential output signal of the filtered differential output signal; and
  a second of current mirrors for outputting a sum of the second set current signal and the third current signal as a second differential output signal of the filtered differential output signal.

7. The filter of claim 6, further comprising:
  a fifth MOS transistor providing the prescribed resistance; and
  a sixth MOS transistor coupled to the fifth MOS transistor and providing the prescribed capacitance.

8. The filter of claim 1, wherein the prescribed relation is $p/(z-p)$, wherein p is the pole and z is the zero, and wherein the second size (S2) equals the first size (S1) reduced by a factor of the prescribed relation ($S2=S1(z-p)/p$).

9. The filter of claim 8, wherein the low pass filter outputs the filtered voltage signal in response to the input voltage signal and according to a first transfer function $H1=p/(s+p)$.

10. The filter of claim 9, wherein the second MOS transistor outputs the second current signal according to a second transfer function $H2=(z-p)/(s+p)$ relative to the input voltage signal.

11. The filter of claim 10, wherein the filter provides the output signal according to a third transfer function $H3=1+(z-p)/(s+p)$ relative to the input voltage signal.

12. A differential input filter having a zero and a pole, the filter comprising:
  a first metal oxide semiconductor (MOS) transistor having a first size and a gate for receiving a first differential input voltage signal, the first MOS transistor in response outputting a first current signal;
  a second MOS transistor having said first size and a gate for receiving a second differential input voltage signal having an inverse polarity relative to the first differential input voltage signal, the second MOS transistor in response outputting a second current signal;
  first and second low pass filters outputting first and second filtered voltage signals in response to the first and second differential input voltage signals, respectively, the first and second low pass filters each outputting the corresponding filtered voltage signal based on a pole defined by a prescribed resistance and a prescribed capacitance,
  third and fourth MOS transistors each having a second size relative to the first size by a prescribed relation between the pole and the zero, the third MOS transistor having a gate for receiving the first filtered voltage signal and in response outputting a third current signal, the fourth MOS transistor having a gate for receiving the second filtered voltage signal and in response outputting a fourth current signal, the first, second, third and fourth current signals providing a differential output signal equalized in accordance with the zero and the pole.

13. The filter of claim 12, wherein the low pass filters each comprise:

a fifth MOS transistor providing the prescribed resistance; and a sixth MOS transistor coupled to the fifth MOS transistor and providing the prescribed capacitance.

14. The filter of claim 13, wherein the fifth MOS transistor has a gate for receiving a control signal, the fifth MOS transistor providing the prescribed resistance based on the control signal.

15. The filter of claim 12, further comprising an output circuit having:

a first set of current mirrors for outputting a sum of the first current signal and the fourth current signal as a first differential output signal of the filtered differential output signal; and a second of current mirrors for outputting a sum of the second current signal and the third current signal as a second differential output signal of the filtered differential output signal.

16. The filter of claim 12, wherein the prescribed relation is p/(z−p), wherein p is the pole and z is the zero, and wherein the second size (S2) equals the first size (S1) reduced by a factor of the prescribed relation (S2=S1(z−p)/p).

17. The filter of claim 16, wherein each low pass filter outputs the filtered voltage signal in response to the corresponding input voltage signal and according to a first transfer function H1=p/(s+p).

18. The filter of claim 17, wherein the third and fourth MOS transistors each outputs the corresponding current signal according to a second transfer function H2=(z−p)/(s+p) relative to the corresponding input voltage signal.

19. The filter of claim 18, wherein the filter provides the differential output according to a third transfer function H3=1+(z−p)/(s+p) relative to the first and second differential input voltage signals.

20. A method of equalizing an input signal according to a single zero and a single pole, the method comprising:

first outputting a first current signal from a first metal oxide semiconductor (MOS) transistor in response to receiving an input voltage signal at a corresponding gate, the MOS transistor having a first size;

second outputting a filtered voltage signal from a low pass filter in response to receiving the input voltage signal, the low pass filter having a pole defined by a prescribed resistance and a prescribed capacitance;

third outputting a second current signal from a second MOS transistor in response to receiving the filtered voltage signal, the second MOS transistor having a second size relative to the first size by a prescribed relation between the pole and a transfer function zero; and supplying the first and second current signals to obtain a filtered signal.

21. The method of claim 20, wherein the low pass filter comprises a third MOS transistor for providing the prescribed resistance and a fourth MOS transistor coupled to the third MOS transistor for providing the prescribed capacitance, the method further comprising supplying a control signal to the third MOS transistor to control the prescribed resistance.

22. The method of claim 20, wherein the prescribed relation is p/(z−p), wherein p is the pole and z is the zero, and wherein the second size (S2) equals the first size (S1) reduced by a factor of the prescribed relation (S2=S1(z−p)/p).

23. The method of claim 22, wherein the second outputting step includes outputting the filtered voltage signal in response to the input voltage signal and according to a first transfer function H1=p/(s+p).

24. The method of claim 23, wherein the third outputting step includes outputting the second current signal according to a second transfer function H2=(z−p)/(s+p) relative to the input voltage signal.

25. The method of claim 24, wherein the combining step includes generating the filtered signal according to a third transfer function H3=1+(z−p)/(s+p) relative to the input voltage signal.

26. A network line equalizer including a filter having a zero and a pole, the filter comprising:

a first MOS transistor having a first size and responsive to an input signal for outputting a first output signal, a low pass filter responsive to the input signal for outputting a filtered signal, and a second MOS transistor having a second size and responsive to the filtered signal for outputting a second output signal, relation between the first size and the second size corresponding to relation between the pole and the zero, the first output signal and the second output signal providing a filter output signal equalized in accordance with the zero and the pole.

* * * * *